United States Patent [19]

Hayashi

[11] 3,920,700

[45] Nov. 18, 1975

[54] ESTERS OF SULFUR-CONTAINING HYDROXY ACIDS

[75] Inventor: Katsumi Hayashi, Mentor, Ohio

[73] Assignee: The Lubrizol Corporation, Cleveland, Ohio

[22] Filed: Feb. 9, 1973

[21] Appl. No.: 331,144

Related U.S. Application Data

[63] Continuation-in-part of Ser. No. 164,068, July 19, 1971, abandoned, Continuation-in-part of Ser. No. 77,759, Oct. 2, 1970, Pat. No. 3,839,438, Continuation-in-part of Ser. No. 868,617, Oct. 22, 1969, abandoned.

[52] U.S. Cl. ...... 260/327 R; 260/481 R; 260/348 A; 260/476 R
[51] Int. Cl.$^2$ ......................................... C07D 327/00
[58] Field of Search ......... 260/481 R, 327 P, 327 R, 260/470, 516, 535 R, 78.3, 340.2

[56] References Cited
UNITED STATES PATENTS

| | | | |
|---|---|---|---|
| 2,477,327 | 7/1949 | Blake | 260/481 |
| 2,610,202 | 9/1952 | Kosmin et al. | 260/481 |
| 2,644,793 | 7/1953 | Rudel et al. | 252/48.6 |
| 2,654,773 | 10/1953 | Zerbe | 260/470 |
| 2,929,834 | 3/1960 | Schrader | 260/461 |
| 3,194,830 | 7/1965 | Dann et al. | 260/481 |
| 3,227,692 | 1/1966 | Graham et al. | 260/78.3 |
| 3,267,071 | 8/1966 | van Schooten et al. | 260/45.85 |
| 3,301,825 | 1/1967 | Hostettler et al. | 260/77.5 |
| 3,523,920 | 8/1970 | Schultz | 260/37 |
| 3,536,661 | 10/1970 | Hagemeyer et al. | 260/45.85 |
| 3,621,051 | 11/1971 | Hechenbleikner et al. | 260/470 |

*Primary Examiner*—Norma S. Milestone
*Assistant Examiner*—C. M. S. Jaisle
*Attorney, Agent, or Firm*—James W. Adams, Jr.; William H. Pittman

[57] ABSTRACT

Non-polymeric esters of sulfur-containing hydroxy acids such as 6-hydroxy-2,2,5,5-tetramethyl-3,4-dithiahexanoic acid are prepared by subjecting the acid to normal esterification reactions or by reacting the corresponding dialdehyde (e.g., 2,2,5,5-tetramethyl-3,4-hexanedial) with an alcohol in the presence of an alkali metal or an alkyl, alkoxide or hydride thereof. The esters include those in which one or both of the hydroxy and carboxy group are esterified, as well as lactones and cyclic esters. They are useful in paints, as rubber vulcanization accelerators, and as intermediates for the preparation of polyesters and polyurethanes, many of which are photodegradable.

9 Claims, No Drawings

ESTERS OF SULFUR-CONTAINING HYDROXY ACIDS

This application is a continuation-in-part of copending applications Ser. No. 164,068, filed July 19, 1971, now abandoned, and Ser. No. 77,759, filed Oct. 2, 1970, now U.S. Pat. No. 3,839,438. Ser. No. 164,068 is also a continuation-in-part of Ser. No. 77,759, which in turn is a continuation-in-part of application Ser. No. 868,617, filed Oct. 22, 1969, now abandoned.

This invention relates to new compositions of matter, and more particularly to non-polymeric esters containing at least one unit of the formula (I) 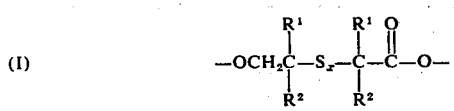

wherein each of $R^1$ and $R^2$ is hydrogen or a hydrocarbon or substituted hydrocarbon radical and $x$ is an integer from 1 to 6, in which ester at least one oxygen atom which is valence-unsatisfied in Formula I is esterified and any nonesterified oxygen atom which is valence-unsatisfied in Formula I is attached to hydrogen, or both valence-unsatisfied oxygen atoms are the same atom.

The term "valence-unsatisfied" as used herein refers to the oxygen atoms in Formula I which have "dangling valences." Thus, it will be apparent from the above description that the esters of this invention are derived from hydroxy acids of the formula

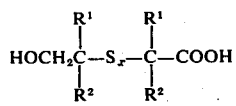

by esterification of the carboxy or hydroxy group or both, and include lactones and cyclic esters. These esters include but are not limited to compounds having the following formulas:

(II) 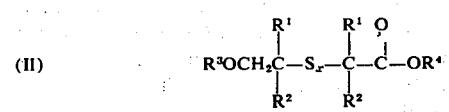

wherein $R^3$ is hydrogen or

and each of $R^4$ and $R^5$ is hydrogen or a hydrocarbon or substituted hydrocarbon radical, at least one of $R^3$ and $R^4$ being other than hydrogen;

(III) 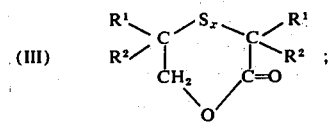

(IV) 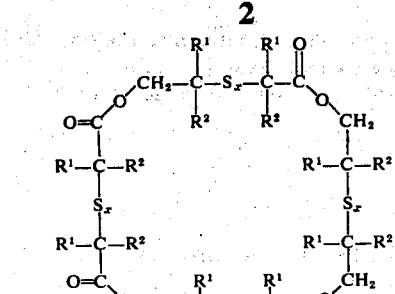 and/or (V) 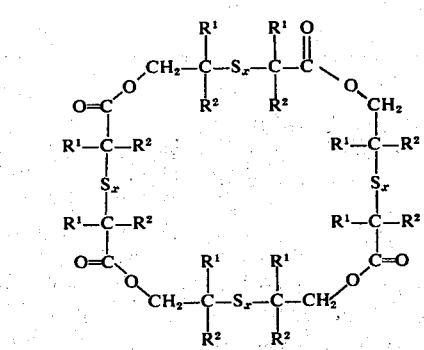

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of hydrocarbon radicals within the scope of this invention. Where a named radical has several isomeric forms (e.g., butyl), all such forms are included.

| | |
|---|---|
| Methyl | Benzyl |
| Ethyl | Cyclohexyl |
| Propyl | Cyclopentyl |
| Butyl | Methylcyclopentyl |
| Hexyl | Cyclopentadienyl |
| Octyl | Vinylphenyl |
| Decyl | Isopropenylphenyl |
| Vinyl | Cinnamyl |
| Allyl | Naphthyl |
| Ethynyl | |
| Propargyl | |
| Phenyl | |
| Tolyl | |
| Xylyl | |
| $-C_6H_3(C_2H_5)_2$ | |
| $-C_6H_4(CH_2)_{11}CH_3$ | |

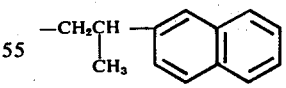

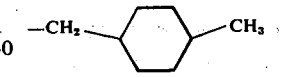

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character or reactivity of the radical. Examples are:

Halide (fluoride, chloride, bromide, iodide)
  Hydroxy
  Ether (especially lower alkoxy)
  Epoxy
  Keto
  Carboxy
  Ester (especially lower carbalkoxy)
  Aminoacyl (amide)
  Amino
  Nitro
  Cyano
  Mercapto
  Thioether
  Sulfoxy
  Sulfone
  Sulfonic acid ester, amide, etc.

In general, no more than about three such substituent groups will be present for each 10 carbons atoms in the radical.

Preferably, the hydrocarbon or substituted hydrocarbon radicals in the compounds of this invention are free from ethylenic and acetylenic unsaturation and have no more than about 30 carbon atoms, desirably no more than about 12 carbon atoms. A particular preference is expressed for lower hydrocarbon radicals, the word "lower" denoting radicals containing up to seven carbon atoms. Still more preferably, they are lower alkyl or aryl radicals, most often alkyl.

The subscript $x$ is, as indicated, an integer from 1 to 6. It is usually from 2 to 6 and is preferably 2.

The following are illustrative of the compounds of this invention.

Methyl 5-hydroxy-3-thiapentanoate
  $HOCH_2CH_2-S-CH_2COOCH_3$

Methyl 6-hydroxy-3,4-dithiahexanoate
  $HOCH_2CH_2-S_2-CH_2COOCH_3$

6-Acetoxy-3,4-dithiahexanoic acid
  $CH_3COOCH_2CH_2-S_2-CH_2COOH$

Methyl 6-acetoxy-3,4-dithiahexanoate
  $CH_3COOCH_2CH_2-S_2-CH_2COOCH_3$

Methyl 6-hydroxy-2,5-dimethyl-3,4-dithiahexanoate

Methyl 6-hydroxy-2,2,5,5-tetramethyl-3,4-dithiahexanoate
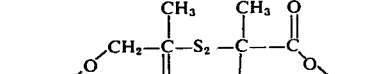

Phenyl 6-hydroxy-2,2,5,5-tetramethyl-3,4-dithiahexanoate
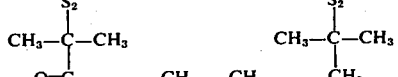

4-Hydroxybutyl 6-hydroxy-2,2,5,5-tetramethyl-3,4-dithiahexanoate
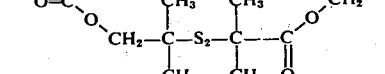

Octadecyl 6-hydroxy-2,2,5,5-tetramethyl-3,4-dithiahexanoate
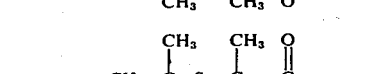

Glycidyl 6-hydroxy-2,5-dimethyl-2,5-diphenyl-3,4-dithiahexanoate
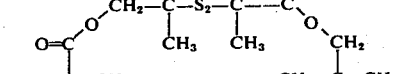

6-Acetoxy-2,2,5,5-tetramethyl-3,4-dithiahexanoic acid
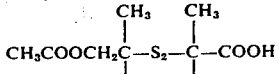

t-Butyl 6-(p-chlorobenzoxy)-2,2,5,5-tetramethyl-3,4-dithiahexanoate
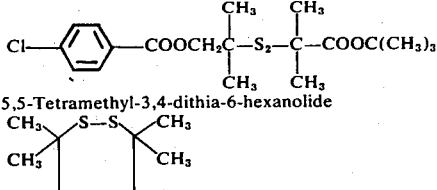

2,2,5,5-Tetramethyl-3,4-dithia-6-hexanolide

Cyclic tetramer ester of 6-hydroxy-2,2,5,5-tetramethyl-3,4-dithiahexanoic acid

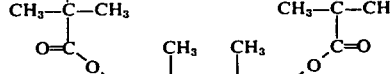

and/or

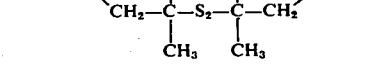

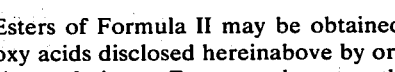

Esters of Formula II may be obtained from the hydroxy acids disclosed hereinabove by ordinary esterification techniques. For example, esters through the carboxylic acid group of the hydroxy acid may be obtained by conversion of the carboxylic acid to an acid halide or anhydride followed by esterification with an alcohol or phenol, by direct esterification with an alcohol or phenol, or the like. Similarly, esters through the hydroxy group of the hydroxy acid may be obtained by reacting the same with an acid halide or anhydride, or with an acid under esterification conditions. Esters through the hydroxy group which may be obtained in this way include esters of sulfonic acids, phosphorus acids and the like as well as esters of carboxylic acids.

Esters wherein both the carboxy and the hydroxy group are esterified are also within the scope of this invention. These may be prepared by carrying out sequential or simultaneous conventional esterification reactions.

The hydroxy acid intermediate may be obtained by treating the corresponding thia-bisaldehyde with an alkaline reagent such as an alkali metal hydroxide or alkaline earth metal hydroxide, preferably in the form of a dilute aqueous solution (e.g., a 5–50% aqueous solution). Suitable alkaline reagents include sodium hydroxide, potassium hydroxide, lithium hydroxide, barium hydroxide, calcium hydroxide and strontium hydroxide. The thia-bisaldehydes are generally known compounds; for example, 2,2,5,5-tetramethyl-3,4-dithiahexanedial may be obtained by the reaction of isobutyraldehyde with sulfur mono-chloride as described in U.S. Pat. No. 2,580,695.

The preparation of hydroxy acids which may be converted into the esters of this invention is illustrated by the following example.

EXAMPLE 1

To 1200 parts by weight (3 moles) of 10% aqueous sodium hydroxide solution is added 412 parts (2 moles) of 2,2,5,5-tetramethyl-3,4-dithiahexanedial. An exothermic reaction occurs which causes the temperature of the mixture to rise to 65°C. The mixture is stirred for 2 hours and the desired 6-hydroxy-2,2,5,5-tetramethyl-3,4-dithiahexanoic acid is isolated by acidification with hydrochloric acid and precipitation. After purification, the hydroxy acid melts at 89°–89.5°C.

Esters according to Formula II wherein $R^3$ is hydrogen and $R^4$ is a hydrocarbon radical may also frequently be prepared directly from the corresponding dialdehyde by reaction with an alcohol in the presence of an alkali metal or an alkyl, alkoxide or hydride thereof, preferably using an excess of the alcohol as a solvent. Alternatively, an inert solvent may be used and the molar ratio of the hydroxy acid to the alcohol may be approximately 1:1.

Lactones according to Formula III may be obtained by elimination of one molecule of water from one molecule of the hydroxy acid, typically by heating with a dehydrating agent such as acetic anhydride.

Cyclic tetramer esters of the type depicted in Formulas IV and V may be prepared by contacting said dialdehyde with a catalytic amount of an alkali metal hydride, alkali metal alkyl or the like, optionally in the presence of a hindered alcohol such as t-butyl alcohol.

The preparation of the esters of this invention is illustrated by the following examples; all parts are by weight unless otherwise indicated.

EXAMPLE 2

A mixture of 190 grams (0.85 mole) of 6-hydroxy-2,2,5,5-tetramethyl-3,4-dithiahexanoic acid, 300 grams (9.4 moles) of methanol and 20 ml. of sulfuric acid is heated under reflux for 20 hours, after which the methanol is removed by distillation and the residual oil is extracted with ether. The ether extract is washed with water, with aqueous sodium bicarbonate solution and again with water and is dried over sodium sulfate. Upon distillation, there is obtained 155 grams (77% of theoretical) of methyl 6-hydroxy-2,2,5,5-tetramethyl-3,4-dithiahexanoate boiling at 100°C./0.025 torr.

EXAMPLE 3

Lithium metal, 0.7 part (0.1 mole), is dissolved in 320 parts (10 moles) of methanol to form a lithium methoxide solution. To this solution is added 206 parts (1 mole) of 2,2,5,5-tetramethyl-3,4-dithiahexanedial. The reaction mixture is stirred for 4 hours after which the methanol is removed by distillation under reduced pressure. The residue is extracted with benzene and the benzene solution is washed with water, with dilute hydrochloric acid and again with water. After drying over magnesium sulfate the benzene is removed and the residue is distilled under vacuum to yield 179 parts (75% of theoretical) of methyl 6-hydroxy-2,2,5,5-tetramethyl-3,4-dithiahexanoate.

EXAMPLE 4

Octadecyl alcohol, 170 grams (1 mole), is dissolved in 400 ml. of benzene and 50 ml. of 1.6 M butyllithium solution is added, with stirring, followed by 206 grams (1 mole) of 2,2,5,5-tetramethyl-3,4-dithiahexanedial. An exothermic reaction occurs which causes the temperature to rise to 75°C. The mixture is stirred for 2 hours at 50°C. after which solvents are removed by vacuum distillation, yielding the desired octadecyl 6-hydroxy-2,2,5,5-tetramethyl-3,4-dithiahexanoate.

EXAMPLE 5

Sodium metal, 4.6 grams (0.2 mole), is added to a mixture of 90 grams (1 mole) of 1,4-butanediol and 400 ml. of benzene, and the mixture is stirred overnight under nitrogen. There is then added, at 40°C., with stirring, 206 grams (1 mole) of 2,2,5,5-tetramethyl-3,4-dithiahexanedial. An exothermic reaction takes place and the reaction mixture is cooled in a water bath. After the reaction ceases and the mixture becomes a clear solution, it is filtered through glass wool, washed 3 times with water, twice with dilute aqueous hydrochloric acid and 3 more times with water, and the benzene phase is separated and dried over magnesium sulfate. Upon evaporation of the benzene, there is obtained 214 grams (72% of theoretical) of 4-hydroxybutyl 6-hydroxy-2,2,5,5-tetramethyl-3,4-dithiahexanoate containing 48.2% carbon (theory 48.6%), 7.95% hydrogen (theory 8.12%), and 24.3% sulfur (theory 21.6%).

EXAMPLE 6

5 grams of a 50% solution in oil of sodium hydride is added to 2000 ml. of t-butyl alcohol and the solution is warmed to 60°C. A solution of 200 grams of 2,2,5,5-tetramethyl-3,4-dithiahexanedial in 300 ml. of t-butyl alcohol is added dropwise, with stirring, over 4 hours at 63°–67°C. The mixture is allowed to stand overnight at room temperature and filtered; the filtrate is evaporated, the residue therefrom dissolved in ether and the ether solution washed with water and dried over magnesium sulfate. The ether is removed by evaporation and the residue is distilled under vacuum. The fraction boiling at 110°C./0.1-0.2 torr is collected and is found to comprise a mixture of t-butyl 6-hydroxy-2,2,5,5-tetramethyl-3,4-dithiahexanoate and a cyclic tetramer ester of 6-hydroxy-2,2,5,5-tetramethyl-3,4-dithiahexanoic acid containing a 28-membered ring.

EXAMPLE 7

To a mixture of 1.15 grams of sodium hydride and 400 ml. of pyridine is added, with stirring, 206 grams (1 mole) of 2,2,5,5-tetramethyl-3,4-dithiahexanedial. An exothermic reaction occurs and the temperature rises to 95°C. After the reaction is complete, the product, which solidifies upon cooling, is washed with acetone and isolated by conventional methods. The purified product is the desired cyclic tetramer ester described in Example 6; it melts at 179°–180°C., has a molecular weight of 812 (theory 824) and contains 31.2% sulfur.

EXAMPLE 8

A mixture of 224 grams (0.91 mole) of sodium 6-hydroxy-2,2,5,5-tetramethyl-3,4-dithiahexanoate, 920 grams (10 moles) of epichlorohydrin and 5 grams of benzyltrimethylammonium chloride is heated at 90°–95°C. for three hours, with stirring. The mixture is then cooled to room temperature and 300 ml. of water is added. The organic layer is separated, washed with water and dried over magnesium sulfate. Volatile materials are removed therefrom by distillation and the residue is dried in a rotary vacuum evaporator, yielding 217 grams (85% of theoretical) of the desired glycidyl 6-hydroxy-2,2,5,5-tetramethyl-3,4-dithiahexanoate containing 46.4% carbon (theory 47.2%), 7.05% hydrogen (theory 7.14%), and 24.0% sulfur (theory 22.8%).

EXAMPLE 9

A mixture of 224 parts (1 mole) of 6-hydroxy-2,2,5,5-tetramethyl-3,4-dithiahexanoic acid and 153 parts (1.5 moles) of acetic anhydride is heated under reflux for 4 hours. Volatile materials are then removed by distillation and the residue is distilled; the distillate is the desired 2,2,5,5-tetramethyl-3,4-dithia-6-hexanolide which, after purification, melts at 55°–56°C. and contains 31.1% sulfur (theory 31.1%).

EXAMPLE 10

To a solution of 246 grams (1 mole) of sodium 6-hydroxy-2,2,5,5-tetramethyl-3,4-dithiahexanoate in 400 ml. of acetic acid is added dropwise, with stirring, 117 grams (1.5 moles) of acetyl chloride over ½ hour. The mixture is stirred for 2 hours and filtered; the residue is washed with acetic acid and the combined filtrates and washings are evaporated in a rotary evaporator. The residue is distilled under vacuum, yielding 203 grams (70.5% of theoretical) of the desired 6-acetoxy-2,2,5,5-tetramethyl-3,4-dithiahexanoic acid which boils at 150°–155°C./0.25 torr.

The esters of this invention find utility in paints and as rubber vulcanization accelerators. They may also be converted to polyesters by reaction with an alkali metal, a hydride, alkyl or alkoxide thereof, or the like, optionally in the presence of one or more other lactones and/or polyhydroxy compounds. Lactones of Formula III are particularly useful for this purpose.

The preparation of polyesters is illustrated by the following examples; all inherent viscosities are measured on a 0.5% w/v solution of the polymer in chloroform, at 30°C.

EXAMPLE 11

2,2,5,5-Tetramethyl-3,4-dithia-6-hexanolide, 15 grams, is heated to 100°C. under nitrogen and 0.2 ml. of a 1.6 M solution of n-butyllithium in n-hexane is added quickly. The mixture is stirred, whereupon polymerization takes place almost instantaneously with the formation of a very viscous product. The mixture is heated at 100°C. for 5 minutes, allowed to stand at room temperature for 1 hour, dissolved in chloroform and precipitated by pouring the chloroform solution into methanol. The precipitate is washed with methanol and allowed to stand in contact with methanol for about 60 hours, whereupon it is converted into a tough solid which is washed further with methanol and dried under vacuum at 60°C. The resulting polymer has an inherent viscosity of 1.20.

Similar products with lower inherent viscosities are obtained by repeating the reaction at 70°C. and 150°C., respectively.

EXAMPLE 12

A mixture of 10 grams of 2,2,5,5-tetramethyl-3,4-dithia-6-hexanolide and 10 grams of 6-hexanolide is heated to 100°C. under nitrogen, and 0.75 ml. of the n-butyllithium solution of Example 11 is added rapidly, with stirring. Polymerization takes place rapidly and the mixture is converted into a solid mass. Upon precipitation and purification as described in Example 11, there is obtained the desired copolyester which has an inherent viscosity of 0.86.

When the same reaction is carried out at room temperature, a similar copolyester having an inherent viscosity of 0.82 is obtained.

EXAMPLE 13

To a mixture of 41.2 grams of 2,2,5,5-tetramethyl-3,4-dithia-6-hexanolide and 1.8 grams of 1,4-butanediol, maintained at 80°C. under nitrogen, is added 0.5 ml. of the n-butyllithium solution of Example 11. An exothermic reaction occurs which causes the temperature to rise to 110°C.; when the temperature begins to drop, an additional 0.5 ml. of n-butyllithium solution is added and the mixture is stirred at 80°C. for 1 hour. Upon purification by dissolving in chloroform, washing, drying and evaporating solvent, the desired hydroxy-terminated polyester is obtained.

EXAMPLE 14

Following the procedure of Example 11, a polyester is obtained by the reaction of 5 grams of 2,2,5,5-tetraethyl-3,4-dithia-6-hexanolide with 0.25 ml. of the n-butyl-lithium solution.

The polyesters described hereinabove are useful for forming masking films on various surfaces. Those in which $x$ is 2 are particularly useful for this purpose since they are subject to photodegradation. Thus, a polyester film may be provided on a surface of metal, glass or the like, such surface typically being coated first with a binding layer of an adherent material such as polyvinyl alcohol. A suitable mask may then be applied to the coating and the masked object exposed to visible or ultraviolet radiation, whereupon photodegradation of the unmasked portions of the film take place, probably by rupture of the sulfur-sulfur bonds. The photodegraded portion of the film may then be rinsed away with a solvent such as an alcohol, typically methanol, to expose a portion of the coated object for etching to prepare printing or lithographic plates, photoresists, etc.

The photodegradation reaction is best effected by exposing the polyester to radiation in the range of 2200–5000 A. Ordinarily, ultraviolet radiation, especially in the range 2200–2900 A, is preferred since radiation in this wavelength range causes spontaneous photodegradation. However, it is also within the scope of this invention to employ radiation of higher wavelengths, up to and including visible light, in the presence of a suitable sensitizer. Effective sensitizers are known to those skilled in the art and include such compounds as xanthone, 2-acetylfluorenone, duroquinone, β-naphthil, benzoquinone, camphorquinone, eosin, propiophenone, cyclopropyl phenyl ketone, acetophenone, 1,3,5-triacetylbenzene, benzaldehyde, o-dibenzoyl-benzene, benzophenone, thioxanthone, 2-acetylfluorene, anthraquinone, flavone, Michler's ketone, acetylbiphenyl, β-naphthyl phenyl ketone, β-acetonaphthone, β-naphthaldehyde, α-naphthyl phenyl ketone, α-acetonaphthone, α-naphthaldehyde, biacetyl, 2,3-pentanedione, benzil, fluorenone, 1,2,5,6-dibenzanthracene, pyrene, benzanthrone, 3-acetylpyrene, 9,10-dimethyl-1,2-dibenzanthracene, antracene and 9,10-dibromoanthracene.

The photodegradation of the polyesters described hereinabove is illustrated by a procedure in which a glass plate is coated with polyvinyl alcohol, a solution of the polyester of Example 11 in 1,1,2,2-tetrachloroethane is applied to the plate, and the solvent is evaporated. A transparent, slightly tacky film is formed. The film is masked with stencil and exposed to ultraviolet light in the wavelength range 2200–2900 A, provided by germicidal lamps. After exposure, the masking is removed and the plates are soaked in a mixture of methanol and dimethylformamide. The film in the exposed portions dissolves and is washed away, leaving an image of the mask.

Polyesters which have terminal hydroxy groups are particularly useful in reactions with isocyanates to form polyurethanes. The polyurethanes thus formed are useful in the preparation of coating compositions, adhesives, foams, etc., and those having polysulfide moieties are photodegradable as described above. Among the isocyanates which may be reacted with the hydroxy-terminated polyesters are toluene diisocyanate, diphenylmethane diisocyanate and naphthalene diisocyanate. In general, compounds of the formula OC—N—R—NCO may be used, wherein R is a divalent hydrocarbon radical, preferably an aromatic or alkyl-aromatic radical. The polyurethanes thus prepared have repeating units of the formula

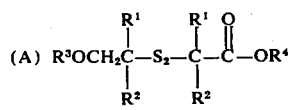

wherein Z is derived from the polyester by abstraction of hydrogen from the hydroxy radicals thereof. In cases where the polyurethane contains isocyanate groups, it may be extended with water, glycols, hydrazine and the like. When so extended, it may also contain urea, alkylene-bis-carbamo, N,N'-bis-carbamohydrazide or similar moieties.

The preparation of polyurethanes from the polyesters of this invention is illustrated by the following example.

EXAMPLE 15

A mixture of 6.09 grams of the polymer of Example 13 and 0.54 gram of toluene diisocyanate is heated at 120°C., under nitrogen, for 30 minutes. The reaction vessel is then evacuated and heating is continued for 20 hours at 120°C. The product, which is the desired polyurethane, is cooled to room temperature, purified by dissolving in chloroform and pouring into an excess of methanol, and dried in vacuum at 60°C.

What is claimed is:

1. An ester selected from the group consisting of:

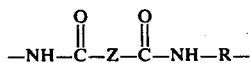

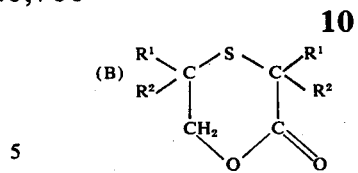

and (C) a cyclic tetramer ester which is

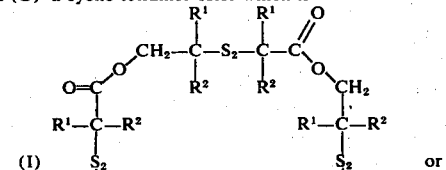

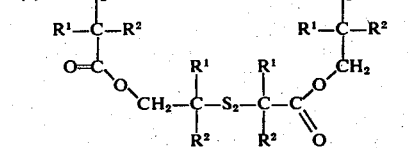

2. An ester according to claim 1 having Formula A wherein each of $R^1$, $R^2$ and $R^4$ is a lower alkyl radical and $R^3$ is hydrogen.

3. An ester according to claim 2 wherein each of $R^1$ and $R^2$ is methyl.

4. An ester according to claim 1 having Formula A wherein

each of $R^1$, $R^2$ and $R^5$ is a lower alkyl radical and $R^4$ is hydrogen.

5. An ester according to claim 4 wherein each of $R^1$ and $R^2$ is methyl.

6. An ester according to claim 1 which is a lactone having Formula B wherein each of $R^1$ and $R^2$ is a lower alkyl radical.

7. An ester according to claim 6 wherein each of $R^1$ and $R^2$ is methyl.

8. An ester according to claim 1 which is a cyclic tetramer ester of Formula I or Formula II or a mixture of Formulas I and II wherein each of $R^1$ and $R^2$ is a lower alkyl radical.

9. An ester according to claim 8 wherein each of $R^1$ and $R^2$ is methyl.

* * * * *

UNITED STATES PATENT OFFICE
CERTIFICATE OF CORRECTION

PATENT NO. : 3,920,700
DATED : November 18, 1975
INVENTOR(S) : Katsumi Hayashi

It is certified that error appears in the above-identified patent and that said Letters Patent are hereby corrected as shown below:

Column 10, lines 1-5, the portion of the formula reading $\diagup S \diagdown$ should read $\diagup S_2 \diagdown$ ; lines 25-30, the portion of the formula reading $S$ should read $S_2$; after line 34, the following should be added:

--or a mixture of Formulas (I) and (II), wherein $R^3$ is hydrogen or $R^5\overset{\overset{O}{\|}}{C}-$ and each of $R^1$, $R^2$, $R^4$ and $R^5$ is hydrogen or a lower alkyl radical, at least one of $R^3$ and $R^4$ being other than hydrogen.--

Signed and Sealed this twentieth Day of April 1976

[SEAL]

Attest:

RUTH C. MASON
*Attesting Officer*

C. MARSHALL DANN
*Commissioner of Patents and Trademarks*